July 27, 1965  C. B. OGLE, JR  3,196,955
ROLL-OVER MECHANISM
Filed Feb. 18, 1963  2 Sheets-Sheet 1
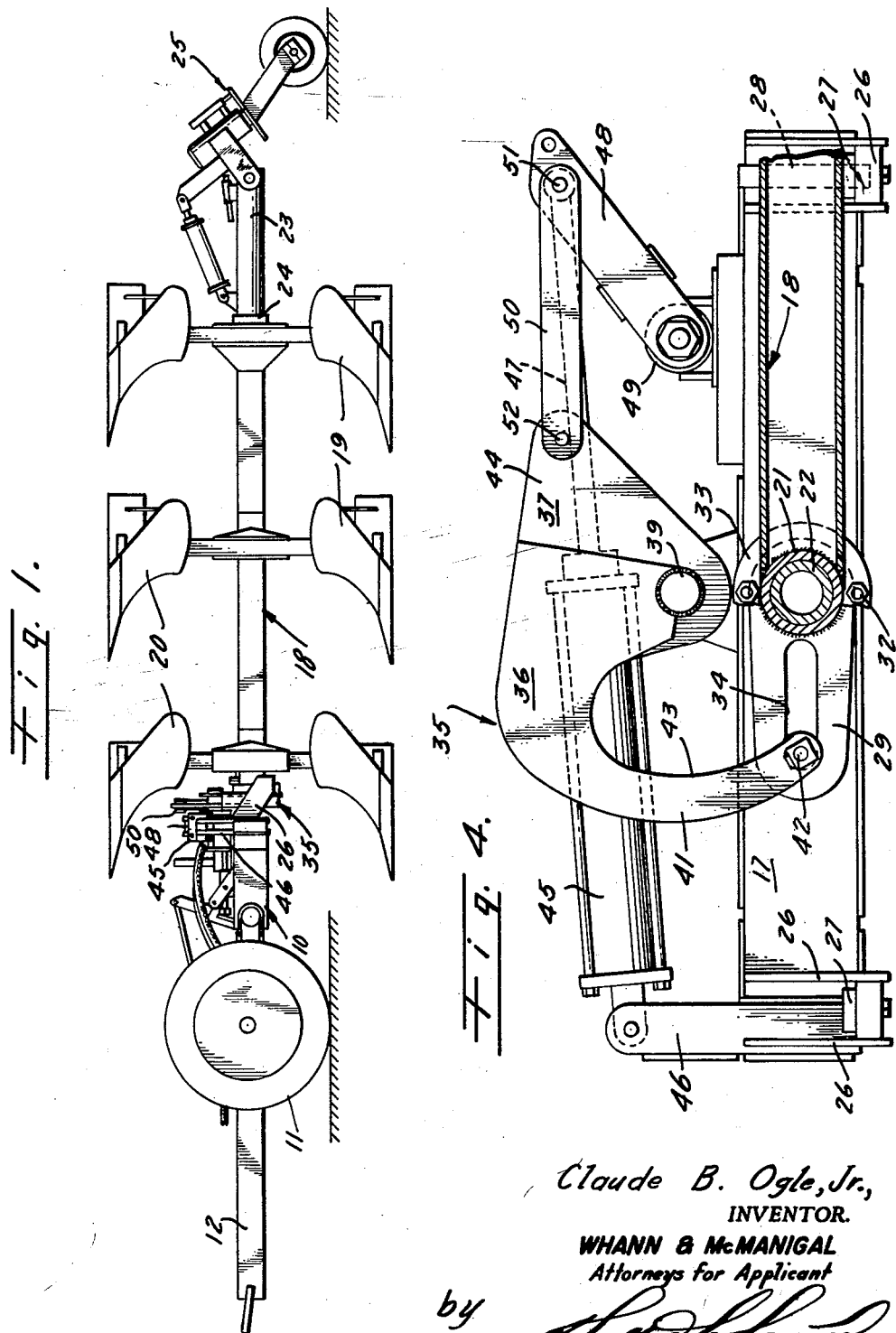
Claude B. Ogle, Jr.,
INVENTOR.
WHANN & McMANIGAL
Attorneys for Applicant
by

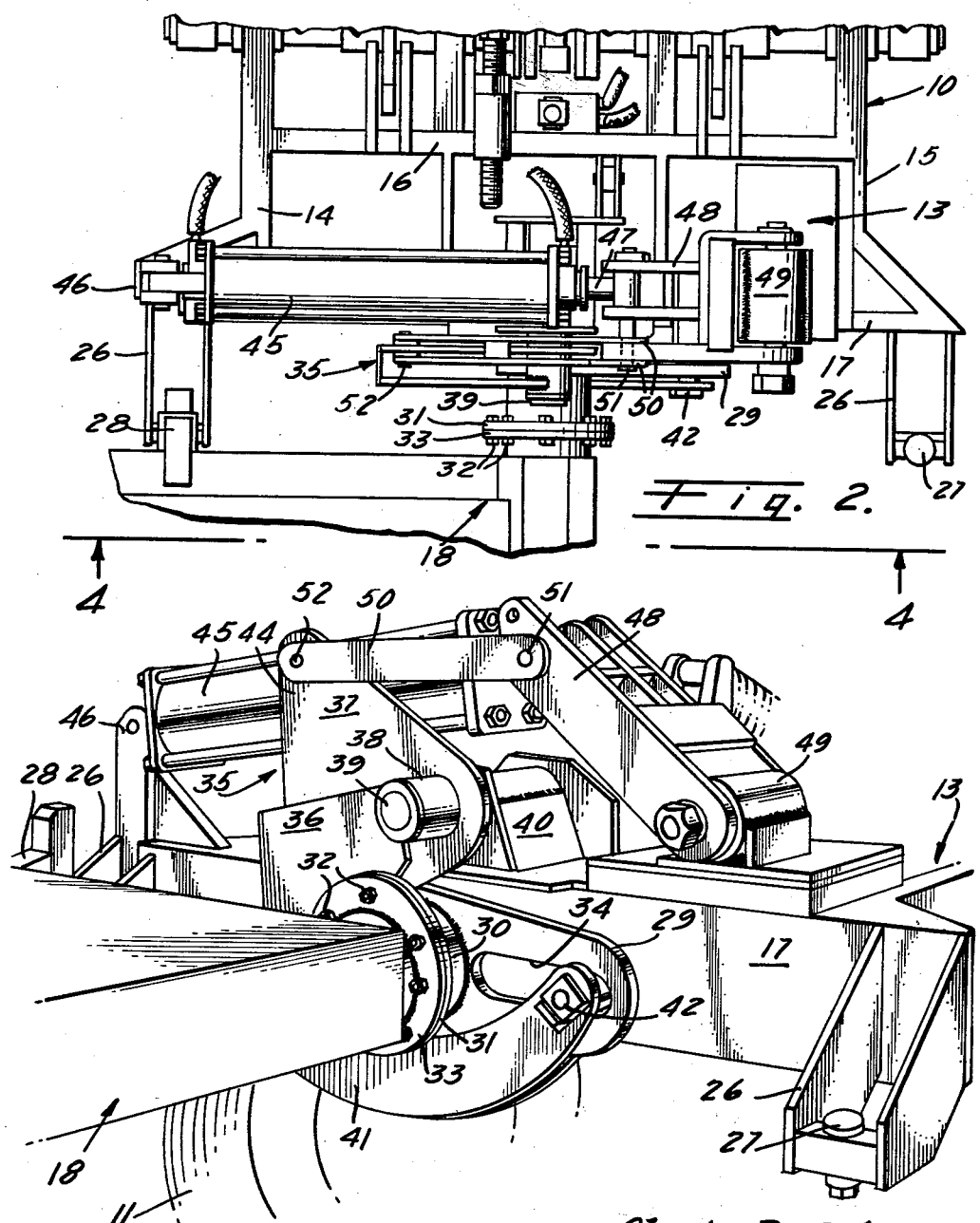

United States Patent Office 3,196,955
Patented July 27, 1965

3,196,955
ROLL-OVER MECHANISM
Claude B. Ogle, Jr., 2495 E. Orange Grove Ave.,
Pasadena, Calif.
Filed Feb. 18, 1963, Ser. No. 259,214
4 Claims. (Cl. 172—225)

The present invention relates generally to an actuating mechanism for converting rectilinear movements of a power means into rotational or tilting movements of an actuated means. More particularly, the invention is concerned with an actuating or roll-over mechanism for a two-way plow, whereby right-hand and left-hand plowing elements thereof may be selectively moved into plowing positions.

Heretofore, a variety of mechanisms having been proposed and used for such purpose, which have included, for example, drum and cable arrangements, sprockets and chains, gear trains, cam plates and the like. In the main, these arrangement have for one reason or another proved more or less unsatisfactory. In some cases, the construction was of such character as to prevent being economically produced. Others of the devices were objectionable in that they embodied numerous points and areas of wear, which could result in unnecessarily frequent expensive replacements of the parts.

Having the foregoing in mind, the present invention seeks to provide improved actuating means, which are particularly adapted for advantageous use in a roll-over mechanism for two-way plows, which are positive and efficient in operation, which embody parts requiring only comparatively simple machining and fabrication operations, and may be produced economically, and which are subject to minimum wear over long periods of use.

A further object is to provide an improved simplified roll-over mechanism in which greater mechanical advantage is obtained at the start of the rolling action to overcome inertia and any unbalancing of the load, and in which the mechanical advantage decreases through the mid-portion of the rolling action where the load is more nearly balanced, and in which greater mechanical advantage is again obtained during the final portion of the rolling action, thus making it possible to accomplish the rolling action with minimum power, free of final impact, and without the necessity of having to resort to the use of expensive and complicated counterweights or spring arrangements.

Another object is to provide an improved actuator mechanism, which utilizes motion transmitting elements which are so positioned and interconnected as to operate in the same direction of rotation during forward and reverse operations thereof.

Further objects of the invention will be brought out in the following part of the specification, wherein detailed description is for the purpose of fully disclosing the invention without placing limitations thereon.

Referring to the accompanying drawings, which are for illustrative purposes only:

FIG. 1 is a side elevational view of a two-way plow embodying the features of the present invention;

FIG. 2 is an enlarged fragmentary plan view showing the various elements of the actuating mechanism and their cooperative relationship with the associated parts of the plow;

FIG. 3 is an enlarged fragmentary perspective view illustrating the actuating means and showing the position of the parts thereof when the roll-over frame is in one operative position of the plowing elements; and FIG. 4 is an enlarged fragmentary transverse section taken substantially on line 4—4 of FIG. 2, and schematically illustrating the positions of the operative parts of the actuating mechanism when the roll-over frame is moved to bring the plowing elements into their other operative position.

Referring more specifically to the drawings, the actuating mechanism of the present invention is disclosed as being embodied in a plow of the type arranged to be towed behind a powered vehicle such as a tractor. It will be appreciated, however, that the actuating mechanism is not limited to this type of plow, but may also be utilized with so-called "direct connected" types of plows. In general, the plow assembly includes a mobile frame structure 10 supported upon wheels 11 and connected with a pulling tongue 12 by means which the mobile frame is attached to the tractor or other powered vehicle.

In plows of this character, means are usually provided on the mobile frame structure by means of which the frame may be raised and lowered through adjustment of the wheel supports.

The mobile frame may assume various structural configurations, but for the purposes of illustration has been shown in the present instance as including a generally rear box-like frame portion 13 which includes side members 14 and 15, and transversely extending spaced apart cross-beams 16 and 17, and which may be interbraced in any desired manner to provide strength in this portion of the frame.

Extending rearwardly of the mobile frame structure is a roll-over frame 18 which carries a left-hand plow gang 19 and a right-hand plow gang 20. The roll-over frame is supported for turning movement by which the plow gangs may be selectively put into operative positions. Thus, the roll-over frame is provided with a tubular member 21 which is rotatably supported upon a hollow fixed tube 22 which provides pivotal support for the roll-over frame in its movement about the longitudinal axis of the tube. The tube 22 is supported at one end within the frame portion 13 of the mobile frame structure, and in this respect extends through the cross beam 17. The other end of the tube 22 extends beyond the roll-over frame and carries a thrust sleeve 23 which is affixed to the tube and is provided with a thrust flange 24 which retains the roll-over frame against rearward axial movement on the fixed tube 22.

This end of the fixed tube 22 may also be utilized to provide a support for an adjustible caster wheel structure as generally indicated at 25.

It will be appreciated that two-way plows of the character described above are conventionally provided with mechanism which will permit raising the roll-over frame 18 sufficiently to clear the plow gangs and permit freedom of turning movement of the roll-over frame in changing from one operative plowing position to the other. The movement of the roll-over frame is limited at the respective operative final positions by providing abutment brackets 26—26 which are respectively positioned at the ends of cross-beam 17. Each bracket carries an abutment pad 27 which is in the path of movement of a projection 28 carried by the roll-over frame structure, when the roll-over frame is moved from one operative position to the other.

The details of the roll-over actuating mechanism will now be described. As best shown in FIG. 3, there is provided, in the space between the forward end of the roll-over frame 18 and the cross-beam 17, a turning arm or lever 29 which is fabricated from plate material. This lever is secured by welding at its inner end to a sleeve 30 which forms a tubular hub adapted to extend around the fixed tube 22 upon which the roll-over frame is supported for turning movement. The sleeve 30 is provided at one end with an annular flange 31 adapted to be secured as by circumferentially extending securing bolts 32 to a companion flange 33 carried by the roll-over frame structure. The arm or lever 29 is provided with a longitudinally extending slot 34 which extends generally from the inner end of the lever adjacent the sleeve 30 to a point adjacent the outermost end of the lever. The lever 29 is so positioned that it projects in a direction opposite that of the roll-over frame from the tubular member 21. As thus arranged, the lever 29 constitutes a driven member which is affixed to and movable with the roll-over frame during its turning movements from one operating position to the other.

Operatively associated with the driven member is a driving member which embodies a lever structure 35. This structure is of composite character and comprises a pair of plate members 36 and 37 which are secured together in spaced relation and welded or otherwise secured to a common hub sleeve 38 adapted to receive a pivot pin 39 by which the lever structure is supported for rotational movements. The pivot pin 39 is supported upon a bracket 40 affixed to the frame portion 13 so that the pivot pin will be positioned above and form an axis of rotation for the lever structure which is in eccentric relation to the axis of rotation of the lever 29 and the roll-over frame.

As best shown in FIG. 4, the plates 36 and 37 on one side of the pivotal support of the lever structure 35 are similarly formed to provide a forked hook-like end portion 41 which is adapted to straddle the lever 29. The outer end of this portion is connected with the lever 29 by means of a pin 42 which extends through and is slidable within the slot 34. By constructing the lever structure with a hooked end portion as just described, a cut-out or opening 43 is formed which permits disposition of the pin 42 on the opposite side of the turning axis of the roll-over frame, when it is moved to an operative position as shown in FIG. 3. In this position, it will be observed that the end portion 41 extends below and around the sleeve 30 of the lever 29.

The plate member 37 also includes an end portion 44 which extends beyond the adjacent end of plate 36 and provides in effect a projecting lever arm on the opposite side of the axis of rotation from that which is connected with the lever 29.

Actuation of the driving member, the lever structure 35, is accomplished by means of a fluid cylinder 45 which is mounted so as to extend transversely with respect to the axis of rotation of the roll-over frame. This cylinder has one end anchored to a bracket structure 46 carried by the frame portion 13 of the mobile frame structure. Associated with the cylinder 45 is a power delivery element 47 which is connected to the outermost end of a turning bracket 48 which is supported at its inner end in a bearing 49 on the frame portion 13. Swinging movement of the turning bracket 48 is transmitted to the lever structure 35 by means of a pair of links 50, 50 which are connected at one set of their ends on opposite sides to the bracket 48 by pivotal connection 51 and at the other ends to the end portion 44 of the lever structure 35 by means of pivotal connection 52.

With this arrangement, it will be apparent that when the power delivery element 47 is in extended position, the lever structure 35 and the lever 29 will have been rotated in the same direction to cooperate to move the roll-over frame to one operative position, namely, that shown in FIG. 4, whereas when the power delivery element is retracted, the parts of the actuating mechanism will be moved to the position shown in FIG. 3 so as to dispose the roll-over frame in its other operative position.

From a consideration of FIGS. 3 and 4, it will be seen that in the operative positions of the roll-over frame, the pin 42 will be disposed in the outer extremities of slot 34, in which position power will be applied to the lever 29 with a maximum mechanical advantage. This increased mechanical advantage is very desirable at these positions of the roll-over frame, as it permits overcoming the inertia and unbalanced load which might inherently result from an off-set plow gang arrangement. When the rolling action of the frame reaches mid-position at which the load is substantially balanced, the pin 42 will have moved into the innermost extremities of the slot 34, during which time the greater mechanical advantage is unnecessary. However, as the roll-over continues, the greater mechanical advantage again comes into play as the pin moves outwardly of the slot 34 so as to reduce or eliminate impact as the roll-over frame moves into its final operating position. The actuating mechanism of the present invention also has the added advantage in that the speed of roll-over is reduced during the periods when the overhang or off-set forces are in greatest opposition to the power means.

Various modifications may suggest themselves to those skilled in the art without departing from the spirit of my invention, and hence, I do not wish to be restricted to the specific form or forms shown or uses mentioned, except to the extent indicated in the appended claims.

I claim:

1. In earth working equipment including a mobile frame having a tool carrier supported thereon for turning movement about a rearwardly extending pivot member to selectively position right-hand and left-hand plow gangs in an operative position:
   (a) power means carried by said mobile frame and having a movable power delivering element;
   (b) motion transmission means between said element and said tool carrier for moving it to said operative positions, said transmission means including
   (c) driving means including a first lever positioned rearwardly of the mobile frame and supported at its inner end above said pivot member for swinging movements of its outer end below said pivot member between positions respectively on opposite sides thereof, said lever being curved to extend around said pivot member in one of said positions;
   (d) driven means including a second lever connected to said carrier and having an axis of rotation coincident with the turning axis of the carrier, said first lever having a substantially coplanar connection at its outer end with said second lever for rotational movements in the same direction during forward and reverse actuations thereof; and
   (e) means operatively connecting the driving means with said element.

2. A two-way plow, comprising:
   (a) a mobile frame having a rearwardly extending member;
   (b) a tool carrier supported on said member for turning movement about a longitudinal axis to selectively position right-hand and left-hand plow gangs in an operative position;
   (c) power means carried by said mobile frame and having a power delivering element movable in a plane having right-angled relation to said longitudinal axis;
   (d) motion transmission means between said element and said tool carrier for moving it to said operative positions, said transmission means including:
   (e) a driving lever structure supported on said mobile frame for rotational movement about a pivotal axis between its opposite ends, said axis being spaced above and in alignment with said longitudinal axis, and one of said lever ends having a length greater than the spacing between said pivotal axis and said longitudinal axis and being curved in a plane normal to said pivotal axis;
   (f) a driven lever movable with said carrier and having an axis of rotation coincident with said longitudinal axis, said driven lever being on the rearward side of said mobile frame, and said one of said driving lever ends and said driven lever being in substantially coplanar relation;

(g) means slidably connecting said one end of said driving lever with said driven lever for concerted movement therewith to position said driven lever on one side of said longitudinal axis in one of said operative positions and on the other side of said axis in the other operative position of the carrier, and with the said one of said lever ends curving around and below said rearwardly extending member in at least one of said operating positions; and (h) means operatively connecting the other end of said lever structure with said element.

3. A two-way plow, according to claim 2, wherein the connections at the opposite ends of the driving lever structure are diametrically positioned on opposite sides of its said pivotal axis.

4. A two-way plow, comprising:
(a) a mobile frame having a rearwardly extending member;
(b) a tool carrier supported on said member for turning movement about a longitudinal axis to selectively position right-hand and left-hand plow gangs in an operative position;
(c) power means carried by said mobile frame and having a power delivering element movable in a plane having right-angled relation to said longitudinal axis;
(d) motion transmission means between said element and said tool carrier for moving the latter to said operative positions, said transmission means including a pair of spaced plate members secured to a common hub pivotally supported on and rearwardly of said mobile frame for rotational movement about a pivotal axis spaced above and in alignment with said longitudinal axis, said plate members extending radially on one side of said hub and cooperating to form a hook-shaped output lever end curved in a plane normal to said pivotal axis, and one of said plate members extending radially on the opposite side of said hub to form an input lever end;

(e) a driven lever movable with said carrier having an axis of rotation coincident with said longitudinal axis and a radially extending end portion having a slot positioned between the plate members at said output lever ends;

(f) a slide member in said slot connecting said output lever end with said driven lever for concerted movements to position said driven lever on one side of said longitudinal axis in one of said operative positions and on the other side of said axis in the other operative position of the carrier, and with the hook-shaped output lever end curving around and below said rearwardly extending member in at least one of said operating positions; and (g) means operatively connecting said input lever end with said power delivering element.

References Cited by the Examiner

UNITED STATES PATENTS

| | | | |
|---|---|---|---|
| 2,644,385 | 7/53 | Brown | 172—225 |
| 2,882,979 | 4/59 | Chandler et al. | 172—225 |

FOREIGN PATENTS

| | | |
|---|---|---|
| 613,644 | 4/32 | Germany. |
| 819,081 | 8/59 | Great Britain. |

T. GRAHAM CRAVER, *Primary Examiner.*